US011112993B2

(12) United States Patent
Ilangovan et al.

(10) Patent No.: US 11,112,993 B2
(45) Date of Patent: Sep. 7, 2021

(54) METHODS AND SYSTEMS FOR MEMORY SUSPECT DETECTION

(71) Applicant: Tata Consultancy Services Limited, Mumbai (IN)

(72) Inventors: Ramkumar Ilangovan, Chennai (IN); Swarup Chatterjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 79 days.

(21) Appl. No.: 15/068,138

(22) Filed: Mar. 11, 2016

(65) Prior Publication Data

US 2017/0177272 A1 Jun. 22, 2017

(30) Foreign Application Priority Data

Dec. 16, 2015 (IN) .......................... 4721/MUM/2015

(51) Int. Cl.
| | |
|---|---|
| *G06F 3/06* | (2006.01) |
| *G06F 11/34* | (2006.01) |
| *G06F 11/36* | (2006.01) |
| *G06F 11/30* | (2006.01) |
| *G06F 21/55* | (2013.01) |

(52) U.S. Cl.
CPC .......... *G06F 3/0653* (2013.01); *G06F 3/0614* (2013.01); *G06F 3/0631* (2013.01); *G06F 3/0673* (2013.01); *G06F 11/3037* (2013.01); *G06F 11/3466* (2013.01); *G06F 11/36* (2013.01); *G06F 21/552* (2013.01); *G06F 2201/865* (2013.01); *G06F 2201/87* (2013.01)

(58) Field of Classification Search
CPC .... G06F 3/0653; G06F 3/0614; G06F 3/0631; G06F 3/0673; G06F 2212/1024; G06F 11/3466; G06F 11/366
See application file for complete search history.

(56) References Cited

U.S. PATENT DOCUMENTS

| | | | | |
|---|---|---|---|---|
| 7,627,671 | B1 * | 12/2009 | Palma ................. | G06F 11/3616 709/223 |
| 8,229,979 | B2 * | 7/2012 | Manolov ............. | G06F 12/0253 707/813 |
| 8,429,620 | B2 * | 4/2013 | Chen ................... | G06F 11/3636 714/42 |
| 8,850,403 | B2 * | 9/2014 | Wintergerst ........ | G06F 11/3409 717/130 |
| 8,966,198 | B1 * | 2/2015 | Harris ............... | G06F 17/30312 711/103 |

(Continued)

*Primary Examiner* — Andrew J Cheong
(74) *Attorney, Agent, or Firm* — Finnegan, Henderson, Farabow, Garrett & Dunner LLP (57) ABSTRACT

This disclosure relates generally to memory suspect detection, and more particularly to system and method for detection of memory suspects in an application runtime environment. The method includes systematically executing a plurality of transactions associated with an application. Executing the plurality of transactions results in generation of metrics. Said metrics includes application memory information and memory allocation information associated with the transactions. Said metrics are periodically captured, Based on the metrics that are periodically captured, a set of transactions are detected from amongst the plurality of transactions that are impacted due to suspected memory allocations.

8 Claims, 4 Drawing Sheets

(56) References Cited

U.S. PATENT DOCUMENTS

| | | | |
|---|---|---|---|
| 2006/0206885 A1 | 9/2006 | Seidman et al. | |
| 2008/0005208 A1* | 1/2008 | Vaswani | G06F 11/3466 |
| 2008/0243969 A1* | 10/2008 | Wintergerst | G06F 11/3466 |
| 2010/0211754 A1* | 8/2010 | Crosby | G06F 9/5016 |
| | | | 711/170 |
| 2011/0138366 A1* | 6/2011 | Wintergerst | G06F 11/3409 |
| | | | 717/130 |
| 2013/0030764 A1* | 1/2013 | Chatterjee | G06F 11/3409 |
| | | | 702/182 |
| 2013/0204911 A1* | 8/2013 | Chaterjee | G06F 11/34 |
| | | | 707/812 |
| 2013/0227402 A1* | 8/2013 | Rossen-Knill | G06F 17/24 |
| | | | 715/255 |
| 2014/0149670 A1* | 5/2014 | Ezra | G06F 3/0614 |
| | | | 711/128 |
| 2015/0120912 A1* | 4/2015 | Tewari | G06Q 10/00 |
| | | | 709/224 |
| 2015/0199252 A1* | 7/2015 | Ilangovan | G06F 11/3409 |
| | | | 702/186 |
| 2015/0261646 A1* | 9/2015 | Chowdhury | G06F 11/3409 |
| | | | 717/130 |
| 2015/0332488 A1* | 11/2015 | Beck | G06K 9/6201 |
| | | | 345/440 |
| 2016/0094401 A1* | 3/2016 | Anwar | H04L 41/142 |
| | | | 709/223 |
| 2017/0160955 A1* | 6/2017 | Jayasena | G06F 3/0613 |

* cited by examiner

METHODS AND SYSTEMS FOR MEMORY SUSPECT DETECTION

PRIORITY CLAIM

This U.S. patent application claims priority under 35 U.S.C. § 119 to: India Application No. 4721/MUM/2015, filed on Dec. 16, 2015. The entire contents of the aforementioned application are incorporated herein by reference.

TECHNICAL FIELD

This disclosure relates generally to memory suspects detection, and more particularly to detection of memory suspects in runtime application environment.

BACKGROUND

In an application environment, application response time and memory utilization are important factors that can affect efficiency of an application. The application response time and memory utilization are sometimes considered two distinct resources from utilization perspective, however, the response time of an application is closely related to the memory utilization. The response time of the application can be improved, if an application data pertaining to the application is cached in memory. In a large application environment, caching of the data in memory poses certain challenges. For instance, many enterprise applications face severe performance problems like slow response time and out of memory errors. Such problems are observed frequently during migration, and/or update of the application and/or servers, third party component, and so on.

In existing methods for identifying problems associated with memory caching, performance analysts periodically take a heap dump which is then analyzed with the help of some memory analysis tools. In an another method, the application is used with profiler to profile memory (object) allocations or every nth allocation to get to know approximate memory usage. Though this approach identifies heavy objects, only in few cases it identifies the root cause and the corresponding use case. In the existing methods, primary target is to get or isolate the objects which are using huge memory. But in most cases, the memory mismanagement is not only related to which object or at what location it is created but also the use case of the application as well. There are possibilities that the same code is used in more than one use cases/scenarios. Hence, irrespective of underlying technology, due to improper use of memory, memory errors occur and they also impact response time drastically. Therefore, monitoring and tracking the proper utilization of memory can be helpful for a better application performance.

SUMMARY

Embodiments of the present disclosure present technological improvements as solutions to one or more of the above-mentioned technical problems recognized by the inventors in conventional systems. For example, in one embodiment, a processor-implemented method for detection of memory suspects is provided. The method includes systematically executing a plurality of transactions associated with an application. The method further includes executing, via one or more hardware processors, the plurality of transactions results in generation of metrics. Said metrics generated on execution of a transaction includes application memory information and memory allocation information associated with the transaction. Further the method includes generating, via the one or more hardware processors, the metrics while systematically executing the plurality of transactions are periodically captured. Based on the metrics that are periodically captured, a set of transactions from amongst the plurality of transactions that are impacted due to suspected memory allocations are detected, via the one or more hardware processors. The memory allocation information of the metrics facilitates in identifying the set of transactions which are impacted.

In another embodiment, a processor-implemented system for detection of memory suspects is provided. The system includes one or more memories and one or more hardware processors, where the one or more memories are coupled to the one or more hardware processors wherein the one or more hardware processors are capable of executing programmed instructions stored in the one or more memories to systematically execute a plurality of transactions associated with an application. Executing the plurality of transactions results in generation of metrics. Said metrics generated on execution of a transaction includes application memory information and memory allocation information associated with the transaction. The metrics generated while systematically executing the plurality of transactions are periodically captured. Based on the metrics that are periodically captured, a set of transactions from amongst the plurality of transactions that are impacted due to suspected memory allocations are detected. The memory allocation information of the metrics facilitates in identifying the set of transactions which are impacted.

In yet another embodiment, a non-transitory computer-readable medium having embodied thereon a computer program for executing a method for detection of memory suspects is provided. The method includes systematically executing a plurality of transactions associated with an application. Executing the plurality of transactions results in generation of metrics. Said metrics generated on execution of a transaction includes application memory information and memory allocation information associated with the transaction. The metrics generated while systematically executing the plurality of transactions are periodically captured. Based on the metrics that are periodically captured, a set of transactions from amongst the plurality of transactions that are impacted due to suspected memory allocations are detected. The memory allocation information of the metrics facilitates in identifying the set of transactions which are impacted.

In still another embodiment, the processor-implemented method for detection of memory suspects is provided. The method includes identifying, via one or more hardware processors, a plurality of transactions of an application. The plurality of transactions are associated with suspected memory allocations and identified based on at least one predefined criteria. The at least one predefined criteria includes identifying memory allocations associated with one or more of classes known for common memory issues, classes associated with memory issues from previous executions, and classes associated with user interest. Further the method includes, systematically executing, via the one or more hardware processors, the plurality of transactions to initiate a plurality of memory allocation requests. Executing the plurality of transactions results in generation of metrics. The metrics generated on execution of a transaction includes at least a memory allocation information associated with the transaction, the memory allocation information associated with a transaction of the plurality of transactions comprises memory allocation type, timestamp, size, and an origin of memory allocation. Furthermore, the method includes periodically capturing the metrics generated while systematically executing the plurality of transactions. In an embodiment, periodically capturing the metrics includes tagging each of the plurality of memory allocation requests with a corresponding unique identifier. A corresponding unique identifier associated with a memory allocation request of the plurality of memory allocation requests includes a hash code of a corresponding allocated memory location, type of an object created in response to the memory allocation request, a timestamp of creation of the object, and the location of the object from source and runtime, and associate the metrics corresponding to each of the plurality of transactions with the corresponding unique identifier. Further the method includes identifying, based on the metrics and the corresponding unique identifier, a set of transactions from amongst the plurality of transactions impacted due to suspected memory allocations.

In still another embodiment, a non-transitory computer-readable medium having embodied thereon a computer program for executing a method for detection of memory suspects is provided. The method includes systematically executing a plurality of transactions associated with an application. The method further includes executing, via one or more hardware processors, the plurality of transactions results in generation of metrics. Said metrics generated on execution of a transaction includes application memory information and memory allocation information associated with the transaction. Further the method includes generating, via the one or more hardware processors, the metrics while systematically executing the plurality of transactions are periodically captured. Based on the metrics that are periodically captured, a set of transactions from amongst the plurality of transactions that are impacted due to suspected memory allocations are detected, via the one or more hardware processors. The memory allocation information of the metrics facilitates in identifying the set of transactions which are impacted.

In still another embodiment, a non-transitory computer-readable medium having embodied thereon a computer program for executing a method for detection of memory suspects is provided. The method includes identifying, via one or more hardware processors, a plurality of transactions of an application. The plurality of transactions are associated with suspected memory allocations and identified based on at least one predefined criteria. The at least one predefined criteria includes identifying memory allocations associated with one or more of classes known for common memory issues, classes associated with memory issues from previous executions, and classes associated with user interest. Further the method includes, systematically executing, via the one or more hardware processors, the plurality of transactions to initiate a plurality of memory allocation requests. Executing the plurality of transactions results in generation of metrics. The metrics generated on execution of a transaction includes at least a memory allocation information associated with the transaction, the memory allocation information associated with a transaction of the plurality of transactions comprises memory allocation type, timestamp, size, and an origin of memory allocation. Furthermore, the method includes periodically capturing the metrics generated while systematically executing the plurality of transactions. In an embodiment, periodically capturing the metrics includes tagging each of the plurality of memory allocation requests with a corresponding unique identifier. A corresponding unique identifier associated with a memory allocation request of the plurality of memory allocation requests includes a hash code of a corresponding allocated memory location, type of an object created in response to the memory allocation request, a timestamp of creation of the object, and the location of the object from source and runtime, and associate the metrics corresponding to each of the plurality of transactions with the corresponding unique identifier. Further the method includes identifying, based on the metrics and the corresponding unique identifier, a set of transactions from amongst the plurality of transactions impacted due to suspected memory allocations.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to a system and methods for detection of memory suspects in an application environment. With reference to the present disclosure, an "application" may include "application software," which may contain one or more units of functionality (e.g., a web portal with email functionality, database programs, word processing programs, accounting programs, numerical analysis programs). An "application" may also include "services," which may contain one logical unit of functionality (e.g., an autonomous unit that is responsible for a transformation, storage and/or retrieval of data, such as a database management service or a database application programming interface (API) service). The services associated with the application may be pertaining to various programs associated with transactions or use-cases provided by the application. For instance, an online ticket booking application may include programs for various transactions or use-cases such as login to the application, searching for availability of tickets, online payments, hotel booking, cab-booking, and so on. In some embodiments, the application can be a stand-alone Java application. In some embodiments, the application can be a complex enterprise application that can utilize a plurality of resources.

During execution of various programs or use cases associated with an application, the application is required to store temporary information for such programs in a portion of memory associated with a system on which the application is executed. The system usually has a limited amount of available memory, and thus if one application uses a major portion of the memory available with the system, other applications may not be able to access the memory required therefor. In order to resolve this situation, the application is required to free-up the memory previously allocated to the application. In particular, once the memory is freed-up, it is reallocated to the system, and the system can further reallocate this memory to any other application or other objects of the same application requiring the memory. Allocating the portion of memory to an application is referred to as 'memory allocation' or 'object allocation'.

In some scenarios, the memory allocated to the application is not freed-up and still remains allocated to the application even when the application is used. Such a scenario where the memory is not cleaned up after use is termed as 'memory leak'. For example, in case of a 'Flight booking' application, once a user logs-in to the website, a user's profile may be loaded to the memory. Upon login, the user may perform multiple transactions such as search, booking, payment, and so on. But the user profile and the data associated with the user profile may remain valid and stored in the memory until the user logs out of the application. In case, the data associated with the user profile remains stored in the memory and is not cleaned, it may be considered as a 'memory leak'. Memory leaks may add up over time, and in case the memory leaks are not cleaned-up, these may result in system slow down, high application response time and out of memory errors. Accordingly, it is necessary to clean up the memory after use for efficient response time.

In a large application/environment, identifying memory allocations which are associated with memory leaks may be difficult as well as time consuming. Herein, the memory allocations which are associated with memory leaks or memory problems may be referred to as 'memory suspects' or 'suspected memory'. One of the methods for identifying memory suspects is periodically retrieving a memory heap dump which can then be analyzed for memory suspects. Often, such memory heap dumps are very huge and the system may be unable to process such heavy memory heap dumps. In another method, the application is used with a profiler to profile memory (or object) allocations, for instance, every $n^{th}$ memory allocation, to determine approximate memory usage. Though this approach identifies heavy objects, only in few cases the root cause and the corresponding use-case associated with the memory leak can be identified.

In some scenarios, the objects of the application which are using huge memory for execution may be identified. But in most cases, the memory mismanagement is not only related to identifying the object or memory location to which the object is allocated, but also the use-case of the application as well. This may be attributed to the fact that same program (or code or function) may be used in more than one use-cases/scenarios associated with the memory. For instance, a program code directed for 'sorting' may be utilized in sorting items associated with different use-cases of an application.

In most of the scenarios, the memory utilization or memory allocation to objects may be specific to the application context or the application use-case. Hence, any memory suspects detected without application context may provide improper guidance to resolve the issue of memory leak. Various embodiments herein disclose systems and methods for detection and analysis of memory suspects associated with an application. In various embodiments, by following a systematic approach to monitor the memory, the memory trends can be generated based on memory usage, application use-cases and changes in the application environment. While aspects of described system and method for detection of memory suspects in an application environment may be implemented in any number of different computing devices, environments, and/or configurations, the embodiments are described in the context of the following exemplary devices.

Figure 1:
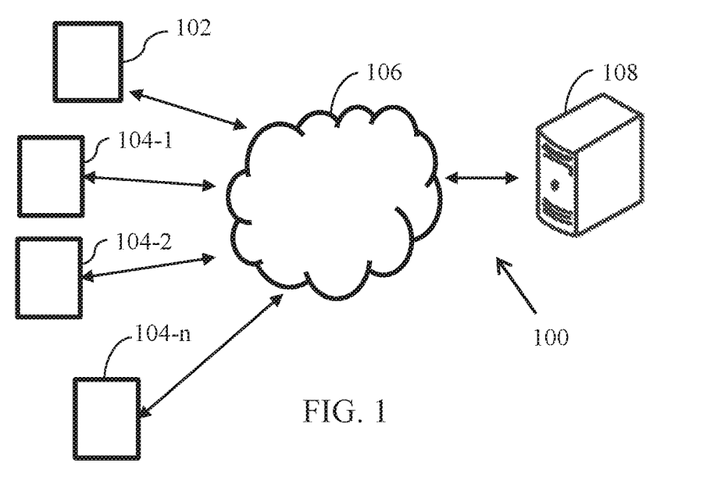
FIG. 1 illustrates a network implementation for detection of memory suspects associated with an application is illustrated according to some embodiments of the present disclosure.

Referring to FIG. 1, a network implementation 100 for detection of memory suspects associated with an application is illustrated, in accordance with an embodiment of the present subject matter. The network implementation 100 is shown to include a system 102, user devices such as user devices 104-1, 104-2 . . . 104-N, and a communication network 106 for facilitating communication between the system 102 and the user devices 104-1, 104-2 . . . 104-N. In one embodiment, the system 102 facilitates common platform for diagnosing memory suspects in an application environment.

Although the present subject matter is explained considering the system 102 being implemented as a single device, it may be understood that the system 102 may also be implemented as a variety of computing systems, such as a laptop computer, a desktop computer, a notebook, a workstation, a mainframe computer, a network server, a tablet, a mobile phone, a robot and the like.

It will be understood that the system 102 may be accessed by multiple users through the one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. In order to run an application session, user devices 104 can establish a corresponding session with a server 108.

In an embodiment, each device 104 can establish a session with the server 108 for communicating with the server 108. The devices 104 can communicate with the server 108 through the communication network 106. The communication network 106 may be a wireless network, a wired network or a combination thereof. The communication network 106 can be implemented as one of the different types of networks, such as intranet, local area network (LAN), wide area network (WAN), the internet, and the like. The communication network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The detection of the memory suspects can be performed by monitoring the memory of the application periodically and collecting inputs from the memory in the live memory. Monitoring the memory facilitates in isolating location of the suspected memory, and also associates the suspected memory allocations with reference to the use-case of the application. In particular, the system monitors the memory in various memory monitoring sessions to determine metrics including memory usage, garbage collections and related use-cases associated with the application. The system facilitates in generating memory trends based on the determined metrics. In some embodiments, a user can initiate a memory monitoring session for an application running on the server 102 using the user device (or a client) 104. In some other embodiments, the memory monitoring can be initiated automatically in a periodic manner.

A client, for instance the devices 104, can establish memory monitoring session with the server 102. During a memory monitoring session, the application is monitored in a controlled environment with systematic execution of various use cases associated with an application running on a JVM on the server 108. The metrics generated during memory monitoring session are collected as snapshots. For example, a system, included on the server 108, can record and store metrics for a memory monitoring session for analysis by the user running the memory monitoring session from the client 104. In some embodiments, the metrics can be stored in a memory on the server 108. In some embodiments, the system 102 can also send the data to the client 104 for analysis by the user. The client 104 can display the data recorded for the application running on the JVM in a graphical user interface (GUI) displayed on the device 104. The collection of the metrics or memory snapshots can be either user triggered or auto configured. The memory snapshots can be categorized as per use-cases and contains the relevant application context to identify the use-case or the business transaction. The system 102 can compare the memory snapshots and verify the same with previous snapshots for memory diagnosis of the application. An example of a system for detection of memory suspects is described further with reference to FIG. 2.

Figure 2:
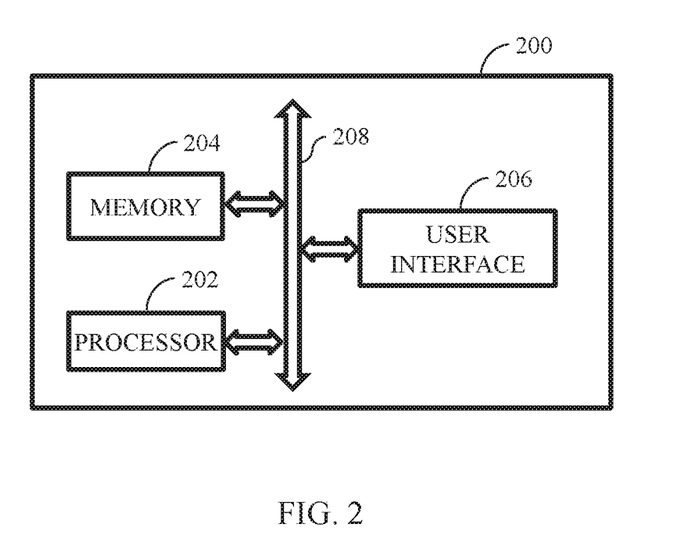
FIG. 2 illustrates a block diagram of a system for detection of memory suspects associated with an application according to some embodiments of the present disclosure.

FIG. 2 illustrates a block diagram of a system 200 for detection of memory suspects associated with an application, in accordance with an example embodiment. The system 200 is an example of the system 108 of FIG. 1. In an example embodiment, the system 200 can be embodied in a computing device. Alternatively, the system 200 can be embodied in a server (for instance, the server 108 of FIG. 1). In an embodiment, the system 200 facilitates in monitoring the memory allocation associated with various transactions or use cases of the application, and further detection of memory suspects based on an analysis of metrics generated during monitoring of the memory. The system 200 includes or is otherwise in communication with one or more hardware processors such as a processor 202, one or more memories such as a memory 204, and a user interface 206. In an embodiment, the processor 202, memory 204, and the user interface 206 may be coupled by a system bus such as a system bus 208 or a similar mechanism.

The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The one or more memories such as a memory 204, may store several pieces of information or data, used by the system to implement the functions of the system. For instance, in an example embodiment, the memory 204 is configured to store the metrics generated during the memory monitoring sessions of the application. The memory 204 may include for example, volatile memory and/or non-volatile memory. The volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some examples of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data pertaining to monitoring the memory allocations, applications, instructions or the like for memory diagnosis to carry out various functions in accordance with various example embodiments. Additionally or alternatively, the memory 204 may be configured to store instructions which when executed by the processor 202 causes the system 200 to behave in a manner as described in various embodiments.

In an embodiment, the system 200 is caused to initiate the application. For instance, the system 200 may be caused to initiate the application based on a user input. On initiating the application, a plurality of memory allocation requests (or objects) may be generated in the runtime environment. Said objects are allocated with respective memory locations. The allocation of memory to the objects may hereinafter be referred to as 'memory allocation' or 'object allocation'. In order to determine memory suspects associated with the application, profiling of memory is performed. Profiling of memory associated with the application, or memory profiling includes a process of investigating and analyzing a program's behavior to determine how to optimize the program's memory usage.

In an embodiment, the system 200 may be caused to perform profiling of the memory associated with the application. In an embodiment, the system 200 may include a profiling agent or a profiler which may be integrated to the application environment for performing memory profiling. The profiler agent may be configured by the processor and may be a component which acts as an agent, collects all relevant metrics from the application and save the metrics to a data store. The profiler agent is capable of injecting binary execution logics in the target application to thereby track the memory allocation requests from the application to the runtime environment. For example, for a java based application, the profiler agent can use Byte Code Instrumentation (BCI) technology to embed itself to the application. Using BCI, a sample java application can be transformed to collect metrics as required.

In an embodiment, the system 200 is caused to transform classes and binaries of the application for enabling the profiler to collect relevant data (or metrics) required for memory profiling. In an embodiment, when the target application is initiated and classes are loaded by a class loader in a runtime environment, the system 200 is caused to transform the classes and binaries based on a determination whether the classes and binaries being loaded satisfy at least one predefined criteria. For example, if $x_i$ represents the classes (binaries) to be loaded by the class loader at runtime, then while loading the classes, the profiler agent intercepts every class load and check for the following predefined criteria/condition:

$x_i \in X_{nf}$, where, $X_{ft}$ is the set of classes satisfying the predefined criteria. In an embodiment, the set of classes satisfying the predefined criteria may include native filters to be applied for memory profiling. Herein the native filters ($X_{nf}$) can be a defined as one or more from below mentioned set:

$X_{nf}$=a specific set of binaries/classes of user interest, and/or
a specific set of binaries/classes which are known for common memory issues, and/or
a specific set of application specific binaries/classes based on memory issues from previous executions.

In an embodiment, the system 200 is caused to apply a profiler transformation (PT) to the memory allocation requests (or classes) satisfying the predefined criteria prior to providing the class bytes to a java agent for memory profiling. The profiler transformation may be represented as follows:

As represented above, applying the profiler transformation includes causing the system 200 to tag the memory allocation requests with a corresponding unique identifier. In an embodiment, the unique identifier is generated based on the hash code of allocated memory associated with the memory allocation request. In an embodiment, the objects can be tagged by generating and tagging a unique number for objects using a function which can be defined as follows:
Unique number generation U=f(type, memory, time, location)
where,
type is the type of object that is created,
memory is the memory location of the object,
time is the timestamp at which the object is created/allocated in nanoseconds,
location is location of object from the source and runtime The location of the object can be defined as a function below:
location=f(thread, class, classloader, method, line number)

where,
thread is the thread which actually created/allocated the object,
class is the fully qualified class name (including package name) of the class in which allocation occurs,
classloader is the classloader type which is used to load the fully qualified class, method is the method name (including signature of method) in which object allocation occurred,
line number is the line number in which the allocation occurred.

Based on the above definition, the system 200 may be caused to create unique numbers/identifiers that can be utilized for tagging the objects. The function is created so as to distinguish objects based on static as well as dynamic parameters. For example, if an object is created in a loop, i.e. objects with the same line number/class can be distinguished based on what class loader was used or what timestamp the object is created or what thread is used.

In an example embodiment, the system 200 is caused to generate metrics having details associated with memory allocation requests that are tagged. For instance, the metrics may be captured in form of a mapping table that include information such as origin of allocation request, timestamp, size, type, and so on associated with the memory allocations that are tagged. The objects under transformation are tagged with a mapping table about the source of allocation. At any time, if the system determines that an object is no longer in use (deallocation/garbage collection), the details of said object are updated in the metrics (or the mapping table). Additionally, the system 200 is caused to periodically capture memory information such as overall memory usage, memory available, time spent on memory retrieval, CPU spent on memory retrieval.

In an embodiment, the system 200 is caused to store memory information pertaining to the allocation/deallocation of the memory along with at least an application use-case pertaining to the memory allocation/deallocation. In an embodiment, the system 200 is caused to automatically store the memory information periodically. In another embodiment, the system 200 is caused to store the memory information based on a user input. For instance, the user may issue a signal to the profiler agent to save the metrics to the memory 204 (or a metrics data store). The metrics can be referred to as a memory snapshot. A memory snapshot may include an application memory information and a memory allocation information. The application memory information may include, but is not limited to, total memory available for the runtime environment, memory used by application, attempts made by runtime environment to clean memory (for example, garbage collection count in java environment), time spent by processor to clean memory (for example, time spent on garbage collection in java environment), and timestamp of the memory snapshot. The memory allocation information may include information such as memory allocation type (structure, class, and so on), timestamp, size, and origin of allocation (for instance, function, source code, and so on).

In an embodiment, the system 200 is caused to systematically monitor the application in a memory monitoring session for detecting the suspected memory. Herein, the term 'systematically monitor' may refer to monitoring the application by iteratively executing a plurality of use cases or transactions associated with the application, where the plurality of use-cases are those use-cases which are associated with the classes satisfying the predefined criteria. In an embodiment, systematically monitoring the application includes accessing the target application with specific targeted use-cases. For instance, a user may access the target application with specific targeted use-cases periodically during a memory monitoring session. In an embodiment, the monitoring of the target application can be performed from the user interface of the system 200. For instance, a user can start the monitoring from the target application from the user interface of the system (or the client device such as the device 104 of FIG. 1). In another embodiment, the system 200 may be auto-configured to access the target application with specific targeted use-cases periodically during the memory monitoring session.

In an embodiment, the system 200 is caused to capture the memory snapshots at the beginning and at the end of the memory monitoring session. Such memory snapshots captured at the beginning and the end of the memory monitoring session are termed as baseline snapshots. The application use-cases may be repeated for multiple iterations during the memory monitoring session. At the end of each iteration, the system 200 is caused to capture a memory snapshot. An example of generating multiple memory snapshots during the memory monitoring session is described further with reference to FIG. 4. In an embodiment, an inverse transformation may be applied to turn off the monitoring completely and return to the application original state. In an embodiment, to end the monitoring session, the system 200 is caused to apply an inverse transformation (also referred to as inverse profiler transformation). The inverse profiler transformation PT'(xi) can be defined as below:

$$PT'(x_i) = \text{if } x_i \in X_{nf}, \begin{cases} \text{Detag object allocation event and} \\ \text{clean up the mapping} \\ \text{Stop Deallocation recording} \end{cases}$$
$$\text{table}$$
$$\text{else,} \quad \{\text{no change in } x_i$$

During the memory monitoring session, the system 200 is caused to store the plurality of memory snapshots generated during the memory monitoring session. In an example embodiment, the system 200 is caused to store the plurality of memory snapshots in the memory of the system 200. In an embodiment, the plurality of memory snapshots can be stored in a data store associated with the system 200, where the data store may be communicatively coupled with the system 200.

The system 200 is caused to group the memory snapshots as per the use-cases or business transactions. Since, all objects under transformation are tagged with a mapping table about the origin of allocation, the system 200 can group the memory snapshots as per the user-case. In an embodiment, the system 200 is caused to parse runtime memory so as to identify the memory allocations tagged with the unique identifier. Accordingly, the allocation list can be populated in the memory snapshot along with other metrics associated with the memory snapshot.

The system 200 is caused to perform analysis of the plurality of snapshots for detecting the memory suspects. In an embodiment, the system 200 is caused to perform analysis based on a comparison of the baseline snapshots with the plurality of intermediate snapshots. The comparison of the baseline snapshots with the plurality of intermediate snapshots can be performed to get the change in count, size of the each type/class of objects.

In an embodiment, based on the plurality of memory snapshots captured during the monitoring session, problematic use-cases causing memory leaks can be detected. In an example embodiment, the system 200 may be configured to perform analytics on the metrics captured during the memory monitoring session, and provide memory trends on top N memory allocation types based on total size and count. In an embodiment, the system 200 may be caused to parse the metrics across the memory snapshots and generate a memory suspect list. For each item in memory allocation information such as memory allocation type (for example, structure, class and so on), timestamp, size, origin of allocation (function/source code), a comparison is made between various memory snapshots to determine a change in count, size of the each type/class of objects. In an embodiment, the system 200 may be caused to generate a graphical pattern for all the object types which have a net increase in overall memory size or count in comparison with baseline start and end snapshots. In an embodiment, the system 200 may be caused to compute a slope for the graph by considering multiple points along the graph. The object types which have highest average positive slope values and no negative slopes can be listed in descending order. If the slope is zero or negative or combination of positive and negative with a net trend of negative they may not be categorized as memory suspects. However, if the slope is linear and positive or the net combined average slope is positive, the corresponding types are candidates for memory suspects.

In an embodiment, the system 200 is caused to highlight the object types in the memory suspect list which are known for frequent memory suspect (general runtime/application specific issues from previous executions). On selection of the memory suspects, a detailed drill down report can be displayed with a stack trace and a correlation graph. The correlation graph is a superimposed graph with object memory size/count graph, other memory details including garbage collection time, total memory available, total used memory to bring a correlated view of memory trend for object type per use cases. As this also shows the time spent on cleaning memory (garbage collection time), the response time or CPU impact due to memory suspect can also be displayed.

In an example embodiment, upon locating the root cause location (code stack trace), application context (particular use case responsible for the cause), the system 200 is caused to generate reports on suspected locations of the application. Once the memory suspects are fixed, the same use-case can be monitored again to compare with previous snapshots to check if the memory issues are resolved.

Figure 3:
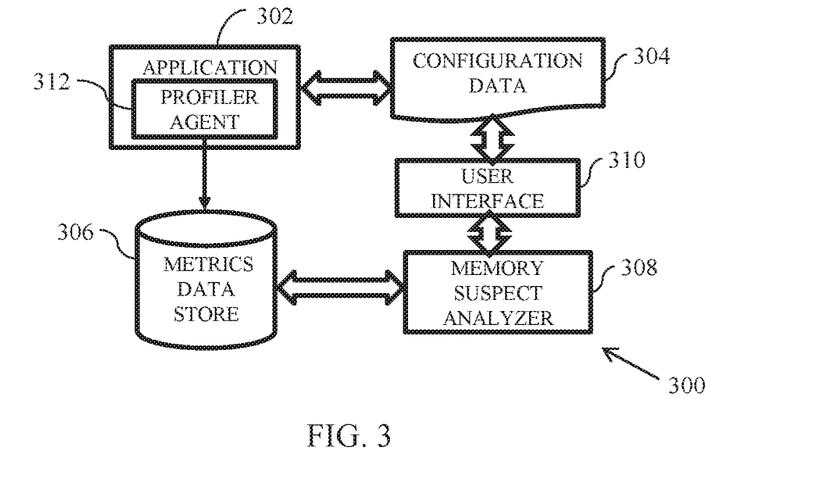
FIG. 3 illustrates an example representation of a functional flow for detecting memory suspects associated with an application according to some embodiments of the present disclosure.

FIG. 3 illustrates an example representation of a functional flow 300 for detecting memory suspects associated with an application, for example, the application 302 in accordance with an example embodiment. The functional flow is shown to include flow amongst various blocks including the application 302, configuration data 304, metrics data store 306, memory suspect analyzer 308, a user interface 310, and profiler agent associated with the application 312.

The application 302 herein represents a target application that may include a plurality of use-cases. For instance, the target application may be an online ticket booking application. The use cases or transactions associated with the ticket booking application may include, for instance, searching for a flight, booking a flight, rescheduling a flight, and so on and so forth.

In order to capture the memory suspects associated with the application 302, the profiler agent 312 is attached with the application 302. The profile agent 312 is configured to systematically profile the memory associated with the application 302, and periodically collect relevant data (such as metrics) associated with the application. The configuration data 304 includes the input regarding capturing of metrics. For instance, the configuration data 304 may include information such as what data to be captured in the metrics, at what time the data has to be captured, and so on. In an embodiment, the configuration data 304 may be provided by a user, and may be stored prior to initiating the memory monitoring session for monitoring the application. In an example embodiment, default auto-generated standard configurations may be used.

The metrics that are collected by the profiler agent 312 can be stored in the metrics data store 306. For instance the metrics data store 306 can store the memory information and memory allocation information associated with the transactions. The metrics data store 306 is coupled with the memory suspect analyzer 308. The metrics collected at the metrics data store 306 is provided to the memory suspect analyzer 308, and the memory suspect analyzer 308 is configured to analyze the data for predicting the memory suspects associated with the application along with the relevant application context (or use-cases or transactions) that are responsible for causing the memory suspects.

Based on the scenario/transactions that are performed, the user interface 310 is configured to show an analysis indicating memory trend for the memory that is exploding. Additionally, the analysis indicates the memory location associated with memory leak, the code (or function) for which the memory leak is occurring, and specific use-case associated with the code for which the memory leak is occurring. The user interface 310 may also enable a user to provide inputs pertaining to capturing of the metrics. For instance, the user may be interested in capturing the metrics or memory snapshot at particular instances of time, and may accordingly provide inputs at the user interface. In an embodiment, the user may initiate a memory monitoring session from the user interface 310 for determining memory suspects. During the memory monitoring session, the metrics can be captured. An example of a memory monitoring session is described further with reference to FIG. 4.

Figure 4:
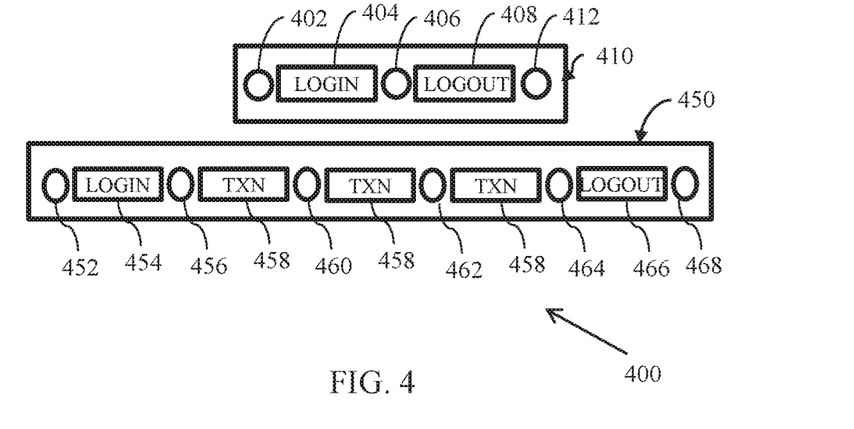
FIG. 4 illustrates an example representation of a memory monitoring session for detecting memory suspects associated with an application according to some embodiments of the present disclosure.

FIG. 4 illustrates an example representation 400 of a memory monitoring session for detecting memory suspects associated with an application, in accordance with an example embodiment. In accordance with the disclosure herein, a memory monitoring session may be defined as a session during which a plurality of transactions associated with the application are executed systematically to detect memory suspects associated with the application.

In an embodiment, the application is initiated and metrics associated with the application are captured. In an embodiment, first baseline memory snapshots may be captured for transaction associated with the application by following a sequence represented as 410. Referring to the sequence 410 in FIG. 4, the metrics (or memory snapshot represented as 402) are captured at initiation of the application. Such metrics 402 which are captured at the initiation of the application may be termed as a baseline memory snapshot. The monitoring session is initiated, and a first transaction 402 is executed. In an embodiment, the first transaction 404 can be a login transaction. On executing the login transaction 404, the metrics (or a memory snapshot) 406 associated with the application is captured. A second transaction which is a log-out transaction (for instance, a log-out transaction 408) is executed, and the metrics 412 associated with the application are captured. An increase or decrease in various parameters associated with metrics is determined based on a comparison of the metrics 402, 406 and 412. In an embodiment the change in size and other parameters being determined can be presented (for example on the user interface) in a graphical form. For instance, a graph can be displayed showing an increase or decrease in the memory after login or logout transactions. In an embodiment, the sequence 410 of logging-in, capturing metrics, logging out and again capturing the metrics can be repeated multiple times (for multiple iterations). An example of performing multiple iterations involving executing the transactions multiple times and capturing metrics is described further with reference to a sequence 450.

Referring to the sequence 450 of FIG. 4, the application is initiated and metrics 452 (or baseline snapshot 452) associated with the application are captured. The memory monitoring session is initiated, and a first transaction 454 is executed. In an embodiment, the first transaction can be a login transaction, for instance the login transaction 454. On executing the login transaction 454, the metrics (or a memory snapshot) 456 associated with the application is captured. A transaction for instance a transaction 458 is executed, and metrics 460 associated with the application are captured on execution of the transaction. The transaction may be associated with a use-case of the application. For instance, in an online booking application, the transaction 458 may be ticket searching transaction. As illustrated in FIG. 4, the transaction is executed multiple times, and after each execution a memory snapshot is generated. For instance, the transaction 458 is executed multiple times and metrics after each execution metrics such as memory snapshots 460, 462, and 464 are captured. Towards the end of the memory monitoring session, a second transaction which is a log-out transaction (for instance a log-out transaction 466) is executed, and the metrics 468 associated with the application are captured.

In an embodiment, based on the snapshots captured in the sequence 410 and the sequence 450, the problematic use cases causing memory leaks can be detected. In an example embodiment the system may be configured to perform analytics on the metrics captured during the memory session, and provide memory suspects, as already discussed with reference to FIG. 2. In an embodiment the metrics collected during execution sequences 410 and 450 can be analyzed for detecting memory suspects. An example flowchart describing the diagnosis of memory suspects is described further with reference to FIG. 5.

Figure 5:
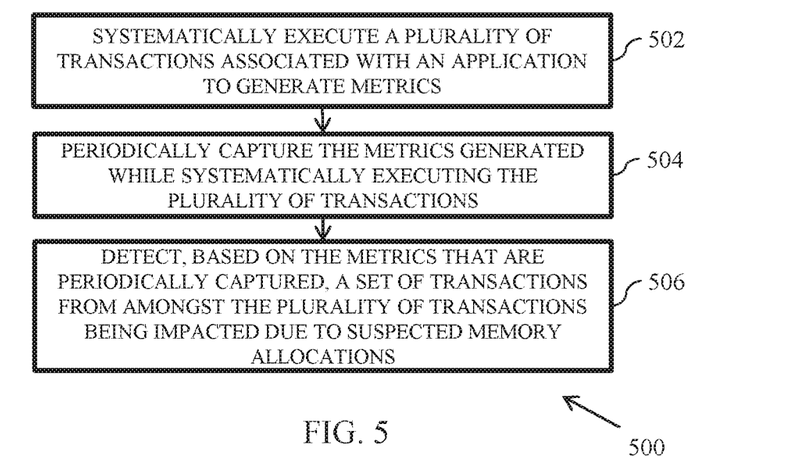
FIG. 5 illustrates a flow diagram of a method for detection of memory suspects associated with an application according to some embodiments of the present disclosure.

FIG. 5 illustrates a flow diagram of a method 500 for detecting memory suspects associated with an application, in accordance with an example embodiment. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method 500 can be implemented in any suitable hardware, software, firmware, or combination thereof. However, for ease of explanation, in the embodiments described below, the method 500 may be considered to be implemented in the above described system 102 (FIG. 1) and/or system 200 (FIG. 2).

At 502, a plurality of transactions associated with an application are systematically executed. In an embodiment, executing the plurality of transactions results in generation of metrics. Said metrics includes application memory information and memory allocation information associated with the transaction. At 504, the metrics generated while systematically executing the plurality of transactions are periodically captured. An example of systematically executing the plurality of transactions and periodically capturing the metrics is explained with reference to FIG. 4.

At 506, based on the metrics that are periodically captured, a set of transactions from amongst the plurality of transactions that are impacted due to suspected memory allocations is detected. In an embodiment, the memory allocation information of the metrics facilitates in identifying the set of transactions which are impacted. A detailed flow diagram of a method for detecting memory suspects associated with an application is described further with reference to FIGS. 6A and 6B.

Figure 6A:
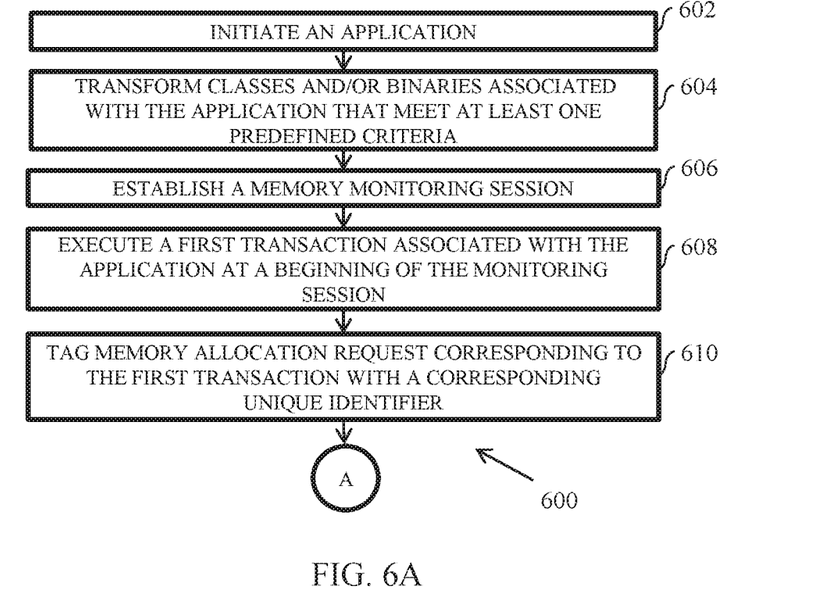
FIGS. 6A and 6B illustrate a flow diagram of a method for detection of memory suspects associated with an application according to some embodiments of the present disclosure.
Figure 6B:
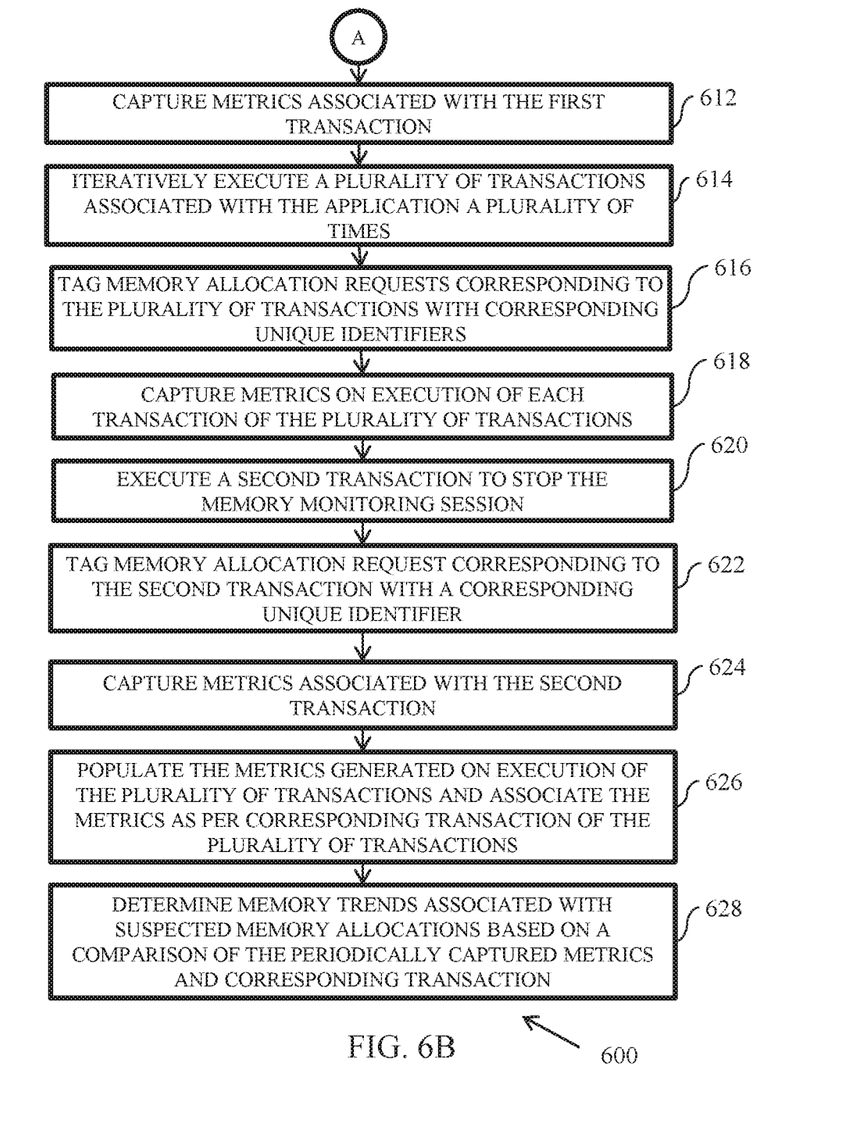

FIGS. 6A and 6B illustrate a flow diagram of a method 600 for detecting memory suspects associated with an application, in accordance with another example embodiment.

At 602, the application is initiated. The application can be initiated by a user via a user interface of a device which is utilized for accessing the application. At 604, classes and/or binaries associated with the application that meet at least one predefined criteria are transformed. In an embodiment, the predefined criteria may include identifying memory allocations associated with at least one of classes known for common memory issues, classes associated with memory issues from previous executions, and classes associated with user interest. In an embodiment, the predefined criteria may be set for identifying those transactions of the application which can be associated with suspected memory allocations.

At 606, a memory monitoring session is established for detecting memory suspects. An example of memory monitoring session for collecting metrics is described in detail with reference to FIG. 4. During the memory monitoring session, at least one transaction associated with the application is iteratively executed, and metrics associated with the memory may be captured after every execution. Such metrics are termed as memory snapshots. For instance, a first transaction associated with the application is executed at a beginning of the monitoring session, at 608. At 610, memory allocation request corresponding to the first transaction is tagged with a corresponding unique identifier. At 612, metrics associated with the first transaction are captured. Such metrics or memory snapshots captured at the beginning of the memory monitoring session may be termed as baseline memory snapshot. At 614, A plurality of transactions associated with the application are executed a plurality of times. Memory allocation requests corresponding to the plurality of transactions are tagged with corresponding unique identifiers at 616, metrics are captured execution after execution of each transaction of the plurality of transactions.

At 620, a second transaction is executed to stop the memory monitoring session. At 622, memory allocation request corresponding to the second transaction is tagged with a corresponding unique identifier. The metrics associated with the second transaction are captured at 624. At 626, the metrics generated on execution of the plurality of transactions are populated. In an embodiment, the metrics may be populated in a table where the metrics are associated with corresponding transaction of the plurality of transactions. In an embodiment, metrics can be associated with the corresponding transactions based on the unique identifier with which memory allocation requests corresponding to the transactions are tagged. At 628, analysis can be performed to determine memory trends associated with suspected memory allocations based on a comparison of the periodically captured metrics and corresponding transactions. Various example analysis which can be performed are described with reference to FIG. 2.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments of the disclosure provide method and system for memory suspect detection. Memory suspects are the memory locations that are suspected to be problematic and/or associated with errors. For instance, the systems may face out of memory errors or slow response time due to suspected memory allocations. Such problems may be observed during migration/update of the application/servers/third party components, and so on. In a large application/environment, identifying such memory is difficult as well as time consuming. Various embodiments of the present disclosure provides a systematic approach to monitor the memory, and generate memory trends based on memory usage, application use cases and changes in the application environment. For example, the disclosed system targets to monitor the memory of the application periodically and collects inputs from memory in live memory, thereby avoiding processing of large dump files. The system is not only targeted to isolate the location of the suspected memory allocations but also associate the same with reference to the use case of the application. The system is also configured to generate trends of the memory based on the memory usage, garbage collections and related application use cases.

In an embodiment, the system is caused to monitor an application for the memory suspects and the impacted use case or business transactions based on the memory trends observed at various use case execution. The application is monitored in a controlled environment with systematic execution of various use cases and metrics are collected as snapshots either user triggered or auto configured. The snapshots are categorized as per the use cases and contain the relevant application context to identify the use case or the business transaction. After the identified suspects from the trends are resolved, the system further facilitates in comparing and verifying with previous snapshots. The system and method disclosed herein only a memory snapshot is analysed instead of a complete heap dump. The size of the memory snapshot is very small as compared to the complete heap dump, and is therefore easy to analyse. Further, the system facilitates in identifying the root cause of object at the code level along with the application context, which involves finding out affected use case or business transaction as well. The system is therefore effective in identifying the root cause of the memory errors.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for memory suspect detection, comprising:
    systematically executing, via one or more hardware processors, a plurality of transactions of an application to generate metrics, the plurality of transactions associated with suspected memory allocations, the suspected memory allocations associated with one or more of classes known for common memory issues, classes associated with memory issues from previous executions, and classes associated with user interest, wherein the classes and binaries of the application satisfy at least one predefined criteria;
    implementing, via the one or more hardware processors, binary execution logics in the application based on the generated metrics, while tracking one or memory allocation requests from the application to a runtime environment;
    establishing, via the one or more hardware processors, a memory monitoring session with a server, wherein the application is monitored in a controlled environment with systematic execution of application use-cases, wherein a plurality of memory snapshots is at least one of user triggered and auto configured and wherein the plurality of memory snapshots are categorized based on the application use-cases and the plurality of memory snapshots contain relevant application context to identify at least one of the application use-cases and the plurality of transactions;
    periodically capturing, via the one or more hardware processors, the metrics generated while systematically executing the plurality of transactions during the monitoring session as the plurality of memory snapshots of each of the plurality of transactions, the metrics generated on execution of one of the plurality of transactions comprises memory allocation information and application memory information associated with the one of the plurality of transactions, wherein the memory allocation information comprise a memory allocation type, a timestamp, a size, and an origin of memory allocation, wherein the metrics are referred to as memory snapshots that are captured at the beginning and at the end of a memory monitoring session termed as baseline snapshots and during the memory monitoring session termed as intermediate snapshots, wherein the memory allocation type comprises a structure and a class, and wherein the application memory information comprise information associated with memory utilized by the application, a number of attempts made by the runtime environment to clean memory, time spent to clean the memory, timestamp of capturing the metrics;
    tagging via the one or more hardware processors, each of a plurality of memory allocation requests with a corresponding unique identifier, wherein the unique identifier associated with a memory allocation request of the plurality of memory allocation requests comprises a hash code of a corresponding allocated memory location, type of object created in response to the memory allocation request, a timestamp of creation of the object, and location of source code from where the memory allocation request is originated, wherein a location of the object is defined as a function of at least one of a thread, a class, a classloader, a method and a line number;
    dynamically updating, via the one or more hardware processors, the generated metrics based on usage of the plurality of transactions;
    parsing, via the one or more hardware processors, the updated metrics across the plurality of memory snapshots captured during the monitoring session to generate a memory suspect list;
    performing analytics on the periodically captured metrics of each of the plurality of transactions to determine a change in count and size of each type or class of memory allocations by parsing the metrics across the memory screenshots to generate a memory suspect list, wherein for each of the memory allocation information, a comparison is made between multiple memory snapshots to determine change in count, size of each type or class of objects;
    identifying, via the one or more hardware processors, a set of transactions from amongst the plurality of transactions impacted due to the suspected memory allocations based on the change in count and size of each type or class of memory allocations, and a graphical pattern is generated for all object types which have a net increase in overall memory size or count in comparison with a baseline start snapshot and a baseline end snapshot, wherein a slope is computed for the graphical pattern by considering multiple point along the graphical pattern in which the object types with highest average positive slope values and no negative slopes are listed in descending order, wherein if the slope is zero or negative or a combination of positive and negative with a net trend of negative, then the object types are not categorized as memory suspects, wherein if the slope is linear and positive or the net combined average slope is positive, then the object types are candidates for memory suspects;

isolating, via the one or more hardware processors, a location of each of the suspect memory allocations to generate one or more trends of memory, based on at least one of memory usage, garbage collections and the application use-cases;

associating each of the suspected memory allocations with reference to one of the plurality of transactions; and profiling, via the one or more hardware processors, each of the suspect memory allocations by implementing the binary execution logics in a target application to track the plurality of memory allocation requests from the target application to the run time environment.

2. The method of claim 1, wherein systematically executing the plurality of transactions comprises: iteratively executing, during the memory monitoring session, at least one transaction of the plurality of transactions a plurality of times in the runtime environment, and wherein iteratively executing the at least one transaction comprises generating the plurality of memory allocation requests corresponding to the at least one transaction.

3. The method of claim 1, further comprising associating the metrics corresponding to the each of the plurality of transactions with the corresponding unique identifier.

4. The method of claim 1, wherein identifying the set of transactions that are impacted due to the suspected memory allocations comprises:

populating the metrics generated on execution of the plurality of transactions, wherein populating comprises associating the metrics as per corresponding transaction of the plurality of transactions; and identifying memory trends associated with the suspected memory allocations based on a comparison of the periodically captured metrics generated during the iterative executing of the at least one transaction in terms of the count and size of each type or class of memory allocations.

5. A processor-implemented system for memory suspect detection comprising:

one or more memories; and one or more hardware processors, the one or more memories coupled to the one or more hardware processors wherein the one or more hardware processors are capable of executing programmed instructions stored in the one or more memories to:

systematically executing a plurality of transactions of an application to generate metrics, the plurality of transactions associated with suspected memory allocations, the suspected memory allocations associated with one or more of classes known for common memory issues, classes associated with memory issues from previous executions, and classes associated with user interest, wherein the classes and binaries of the application satisfy at least one pre-defined criteria;

implementing binary execution logics in the application based on the generated metrics, while tracking one or memory allocation requests from the application to a runtime environment;

establishing a memory monitoring session with a server, wherein the application is monitored in a controlled environment with systematic execution of application use-cases, wherein a plurality memory of snap shots is at least one of user triggered and auto configured and wherein the plurality of memory snapshots are categorized based on the application use-cases and the plurality of memory snapshots contain relevant application context to identify at least one of the application use-cases and the plurality of transactions;

periodically capturing the metrics generated while systematically executing the plurality of transactions during the monitoring session as the plurality of memory snapshots of each of the plurality of transactions, the metrics generated on execution of one of the plurality of transactions comprises memory allocation information and application memory information associated with the one of the plurality of transactions, wherein the metrics are referred to as memory snapshots that are captured at the beginning and at the end of a memory monitoring session termed as baseline snapshots and during the memory monitoring session termed as intermediate snapshots, wherein the memory allocation information comprise a memory allocation type, a timestamp, a size, and an origin of memory allocation, wherein the memory allocation type comprises a structure and a class, and wherein the application memory information comprise information associated with memory utilized by the application, a number of attempts made by the runtime environment to clean memory, time spent to clean the memory, timestamp of capturing the metrics;

tagging each of a plurality of memory allocation requests with a corresponding unique identifier, wherein the unique identifier associated with a memory allocation request of the plurality of memory allocation requests comprises a hash code of a corresponding allocated memory location, type of object created in response to the memory allocation request, a timestamp of creation of the object, and location of source code from where the memory allocation request is originated, wherein a location of the object is defined as a function of at least one of a thread, a class, a classloader, a method and a line number;

dynamically updating the generated metrics based on usage of the plurality of transactions;

parsing the updated metrics across the plurality of memory snapshots captured during the monitoring session to generate a memory suspect list;

performing analytics on the periodically captured metrics of each of the plurality of transactions to determine a change in count and size of each type or class of memory allocations by parsing the metrics across the memory screenshots to generate a memory suspect list, wherein for each of the memory allocation information, a comparison is made between multiple memory snapshots to determine change in count, size of each type or class of objects;

identifying a set of transactions from amongst the plurality of transactions impacted due to the suspected memory allocations based on the change in count and size of each type or class of memory allocations and a graphical pattern is generated for all object types which have a net increase in overall memory size or count in comparison with a baseline start snapshot and a baseline end snapshot, wherein a slope is computed for the graphical pattern by considering multiple point along the graphical pattern in which the object types with highest average positive slope values and no negative slopes are listed in descending order, wherein if the slope is zero or negative or a combination of positive and negative with a net trend of negative, then the object types are not categorized as memory suspects, wherein if the slope is linear and positive or the net combined average slope is positive, then the object types are candidates for memory suspects;

isolating a location of each of the suspect memory allocations and associating each of the suspected memory allocations to generate one or more trends of memory, based on at least one of memory usage, garbage collections and the application use-cases; and profiling, via the one or more hardware processors, each of the suspect memory allocations by implementing the binary execution logics in a target application to track a plurality of memory allocation requests from the target application to the run time environment.

6. The system of claim 5, wherein to systematically execute the plurality of transactions, the one or more hardware processors are further capable of executing programmed instructions to: iteratively execute, during the memory monitoring session, at least one transaction of the plurality of transactions a plurality of times in the runtime environment, and wherein to iteratively execute the at least one transaction, the one or more hardware processors, is further capable of executing programmed instructions to generate the plurality of memory allocation requests corresponding to the at least one transaction.

7. The system of claim 1, wherein the one or more hardware processors are further capable of executing programmed instructions to associate the metrics corresponding to the each of the plurality of transactions with the corresponding unique identifier.

8. The system of claim 5, wherein to identify the set of transactions that are impacted due to the suspected memory allocations, the one or more hardware processors are further capable of executing programmed instructions to:

populate the metrics generated on execution of the plurality of transactions, wherein populating comprises associating the metrics as per corresponding transaction of the plurality of transactions; and identify memory trends associated with the suspected memory allocations based on a comparison of the periodically captured metrics generated during the iterative executing of the at least one transaction in terms of the count and size of each type or class of memory allocations.

* * * * *